(12) United States Patent
Buxton et al.

(10) Patent No.: US 8,413,700 B2
(45) Date of Patent: Apr. 9, 2013

(54) TIRE HAVING STAGGERED TURN-UPS

(75) Inventors: Todd A Buxton, Norton, OH (US);
Bradley J Harris, New London, OH (US); Taro Iwamoto, Tokyo (JP);
Christopher A Swartzwelder, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 363 days.

(21) Appl. No.: 12/827,675

(22) Filed: Jun. 30, 2010

(65) Prior Publication Data

US 2011/0186201 A1    Aug. 4, 2011

Related U.S. Application Data

(63) Continuation-in-part of application No. 12/700,051, filed on Feb. 4, 2010.

(51) Int. Cl.
*B60C 15/00* (2006.01)
*B60C 15/06* (2006.01)

(52) U.S. Cl.
USPC ........... 152/552; 152/539; 152/541; 152/542; 152/548; 152/554

(58) Field of Classification Search .......... None
See application file for complete search history.

(56) References Cited

U.S. PATENT DOCUMENTS

| | | | |
|---|---|---|---|
| 3,245,455 A * | 4/1966 | Lewis ........................... 152/543 |
| 3,951,192 A | 4/1976 | Gardner et al. |
| 4,726,408 A * | 2/1988 | Alie et al. ..................... 152/541 |
| 5,221,385 A | 6/1993 | Hanada et al. |
| 5,253,692 A | 10/1993 | Stephens et al. |
| 5,261,474 A | 11/1993 | Lobb et al. |
| 5,361,820 A | 11/1994 | Adachi |
| 5,379,820 A | 1/1995 | Cesar et al. |
| 5,385,190 A | 1/1995 | Assaad |
| 5,427,164 A * | 6/1995 | Williams et al. ........... 152/209.1 |

(Continued)

FOREIGN PATENT DOCUMENTS

| EP | 0287497 | 10/1988 |
|---|---|---|
| EP | 0756950 | 2/1997 |

(Continued)

OTHER PUBLICATIONS

Machine translation of JP 2002-192920, 2002.*

(Continued)

*Primary Examiner* — Justin Fischer (57) ABSTRACT

A tire having a circumferential tread, at least one belt, an inner liner, a pair of sidewalls, and at least three carcass plies. The tire includes a pair of bead portions, each including a bead core, a bead filler, a flipper, a chafer, and a gum strip. The at least three carcass plies extend radially downward, inward of the bead filler, extend around the bead core, and continue upward, outward of the bead filler and terminate in at least three turn-up ends. At least one of the turn-up ends does not contact at least one of the radially downward extending carcass plies, the flipper, or the bead filler in one of the sidewalls, and at least two of the turn-up ends contact at least one of the radially downward extending carcass plies, the flipper, or the bead filler in one of the sidewalls.

17 Claims, 6 Drawing Sheets

U.S. PATENT DOCUMENTS

| | | | |
|---|---|---|---|
| 5,427,166 | A | 6/1995 | Willard, Jr. |
| 5,538,063 | A | 7/1996 | Dwenger et al. |
| 5,688,343 | A | 11/1997 | Minami et al. |
| 5,743,976 | A | 4/1998 | Pena et al. |
| 5,769,982 | A | 6/1998 | De Loze de Plaisanc |
| 5,820,710 | A | 10/1998 | Behnsen et al. |
| 5,871,602 | A | 2/1999 | Paonessa et al. |
| 5,879,485 | A | 3/1999 | Sakamoto et al. |
| 5,958,163 | A | 9/1999 | Kojima |
| 5,971,049 | A | 10/1999 | Minami et al. |
| 6,148,889 | A | 11/2000 | Minami et al. |
| 6,318,431 | B1 | 11/2001 | Ueyoko et al. |
| 6,408,914 | B1 | 6/2002 | Lamock et al. |
| 6,598,646 | B1 | 7/2003 | Minami et al. |
| 6,622,765 | B1 | 9/2003 | Corsi |
| 6,634,397 | B1 | 10/2003 | Oare et al. |
| 6,648,041 | B2 | 11/2003 | Ueyoko |
| 6,659,148 | B1 | 12/2003 | Alie et al. |
| 6,834,698 | B2 | 12/2004 | Suzuki et al. |
| 6,834,699 | B2 | 12/2004 | Corsi |
| 6,840,297 | B2 | 1/2005 | Farinola |
| 6,913,053 | B2 | 7/2005 | Reep et al. |
| 6,972,061 | B1 | 12/2005 | Kubinski et al. |
| 7,040,366 | B2 | 5/2006 | Minami et al. |
| 7,093,635 | B2 | 8/2006 | Ueyoko |
| 7,096,909 | B1 | 8/2006 | Ueyoko |
| 7,100,655 | B2 | 9/2006 | Ueyoko |
| 7,201,199 | B2 | 4/2007 | Tonezzer et al. |
| 7,320,350 | B2 | 1/2008 | Wright |
| 7,503,360 | B2 | 3/2009 | Rielly et al. |
| 7,712,500 | B2 | 5/2010 | Hayashi et al. |
| 7,997,318 | B2 | 8/2011 | Maruoka |
| 2002/0162616 | A1 | 11/2002 | Bernard et al. |
| 2003/0217801 | A1 | 11/2003 | Reep et al. |
| 2005/0045260 | A1 | 3/2005 | Maruoka et al. |
| 2005/0145314 | A1 | 7/2005 | Ikeda et al. |
| 2005/0274444 | A1 | 12/2005 | Ueyoko et al. |
| 2009/0101267 | A1 | 4/2009 | Neubauer et al. |
| 2009/0151843 | A1 | 6/2009 | Villanueva |
| 2009/0151845 | A1 | 6/2009 | Skurich et al. |
| 2010/0024948 | A1 | 2/2010 | Westgate et al. |

FOREIGN PATENT DOCUMENTS

| | | | |
|---|---|---|---|
| EP | 0810107 | | 3/1997 |
| EP | 1201463 | | 2/2002 |
| EP | 1452346 | | 1/2004 |
| JP | 07-164813 | | 6/1995 |
| JP | 10-044725 | | 2/1998 |
| JP | 11-170823 | | 6/1999 |
| JP | 2002-137608 | | 5/2002 |
| JP | 2002-192920 | * | 7/2002 |
| JP | 2004-182021 | | 2/2004 |
| JP | 2009-262744 | | 11/2009 |
| KR | 20-0114751 | | 4/1998 |

OTHER PUBLICATIONS

US 2005/0074072, 06/2002, Suzuki et al. (withdrawn).

Zibell, Martin, Written Opinion of the International Searching Authority, PCT Application US2011/042313, Oct. 14, 2011, pp. 9-14, European Patent Office, Munich, Germany.

Lee Chang Won, Written Opinion of the International Searching Authority, PCT Application US2011/023313, Sep. 30, 2011, pp. 1-4, Korean Intellectual Property Office, Daejeon, Republic of Korea.

Bai, Lingfei, International Preliminary Report on Patentability, PCT Application US2011/042313, Jan. 8, 2013, pp. 1-9, The International Bureau of WIPO, Geneva, Switzerland.

* cited by examiner

TIRE HAVING STAGGERED TURN-UPS

CROSS-REFERENCE TO RELATED APPLICATIONS

This U.S. non-provisional application is a continuation-in-part application that claims priority from U.S. Non-provisional patent application Ser. No. 12/700,051, entitled TIRE HAVING GUM STRIP AND CHAFER, filed Feb. 4, 2010, the disclosure of which is incorporated by reference herein in its entirety.

FIELD OF INVENTION

The present application is directed to ply construction for tires. More particularly, the present application is directed to tires having staggered turn-ups in a tire sidewall.

BACKGROUND

Tires include a tread, sidewalls, and bead portions wherein the tire secures to a tire rim when the tire is put under pressure. Tires also include carcass plies between an inner liner and tread and sidewall of the tire that wrap from a first bead portion to a second bead portion. The carcass plies wrap around each bead core and form turn-up portions that each have turn-up ends. Turn-up ends are the ends of each carcass ply that are typically outward and above each bead core.

SUMMARY

A tire is disclosed herein having a circumferential tread, at least one belt, an inner liner, a pair of sidewalls, and at least three carcass plies. The tire further includes a pair of bead portions, each including a bead core, a bead filler, a flipper, a chafer, and a gum strip.

The at least three carcass plies extend radially downward, inward of the bead filler, extend around the bead core, and continue upward, outward of the bead filler and terminate in at least three turn-up ends. Further, at least one of the turn-up ends does not contact at least one of the radially downward extending carcass plies, the flipper, or the bead filler in one of the sidewalls, and at least two of the turn-up ends contact at least one of the radially downward extending carcass plies, the flipper, or the bead filler in one of the sidewalls.

Another tire is disclosed herein having a circumferential tread, at least one belt, an inner liner, a pair of sidewalls, shoulder inserts, and a pair of bead portions, each including a bead core, a bead filler. The tire further includes n carcass plies extending circumferentially about the tire, where n is a number greater than 2. The n carcass plies extend radially downward, inward of the bead filler, extend around the bead core, and continue upward, outward of the bead filler and terminate in n turn-up ends. At least one, but not more than n−2 of the n turn-up ends does not contact at least one of the radially downward extending carcass plies in one of the sidewalls.

BRIEF DESCRIPTION OF THE DRAWINGS

In the accompanying drawings, structures are illustrated that, together with the detailed description provided below, describe exemplary embodiments of a tire having staggered turn-ups. One of ordinary skill in the art will appreciate that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Directions are stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
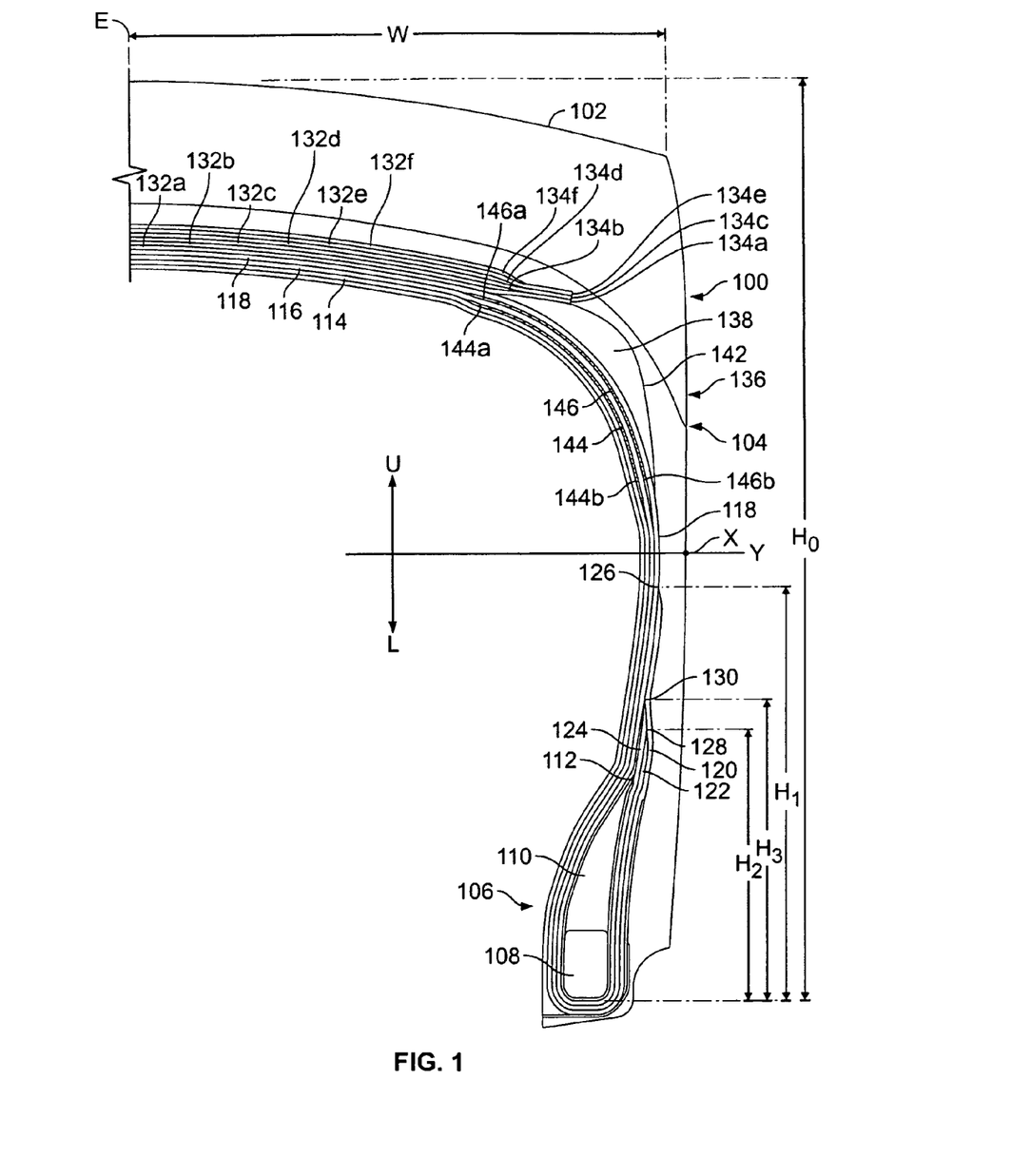
FIG. 1 illustrates a partial cross-section of one embodiment of a tire having three turn-ups.

FIG. 1 is a cross-sectional view of half of one embodiment of a tire 100 having a circumferential tread 102 and a sidewall 104. In one embodiment, tire 100 is configured to operate under a pressure of at least 35 pounds per square inch. In another embodiment, tire 100 is configured to operate under a pressure of at least 40 pounds per square inch. In yet another embodiment (not shown), a tire is configured to operate under a pressure of at least 6 pounds per square inch when the tire carries 140% of the tire's rated load. Although only one quadrant of the tire 100 is depicted in the drawings, it will be appreciated that the opposing quadrant of the tire 100 can be a substantial mirror image of the half depicted or can be substantially different than the half depicted.

In the illustrated embodiment, the tire 100 has an equatorial plane E and a maximum section width W measured from the equatorial plane E to the outer most point of the tire 100, point X on sidewall 104. The cross-section of the illustrated quadrant of tire 100 can be divided into two sections—an upper section U and a lower section L. Separating the upper section U from the lower section L is an imaginary line Y drawn through point X that is substantially parallel to the axis of rotation of the tire 100. The upper section U is the portion of the tire 100 that is disposed above point X of the tire 100 (portion above line Y), while the lower section L is disposed below point X of the tire 100 (portion below line Y).

With continued reference to FIG. 1, the tire 100 includes a bead portion 106 provided in the lower section L of the tire 100. The bead portion 106 includes a bead core 108 and a bead filler 110 having an upper end 112.

The tire 100 also includes first, second, and third carcass plies 114, 116, 118 that extend circumferentially about the tire 100 from one bead portion (e.g., bead portion 106) to the other bead portion (not shown). The first, second, and third carcass plies 114, 116, 118 extend downward, inward of the bead filler, extend around the bead core 108, and continue upward, outward of the bead filler 110 towards the tread 102 to form first, second, and third turn-up portions 120, 122, 124, respectively. Each turn-up portion 120, 122, 124 terminates at first, second, and third turn-up ends 126, 128, 130, respectively.

The height of a turn-up portion is measured radially from the base of a bead core to the turn-up end. With continued reference to FIG. 1, first turn-up portion 120 of first carcass ply 114 has a first height $H_1$. Second turn-up portion 122 of second carcass ply 116 has a second height $H_2$ that is less than first height $H_1$. Third turn-up portion 124 of third carcass ply 118 has a third height $H_3$ that is less than first height $H_1$ and greater than second height $H_2$. First turn-up end 126 of first turn-up portion 120 and third turn-up end 130 of third turn-up portion 124 contact downward extending third carcass ply 118 in the sidewall 104 of the tire 100. Second turn-up end 128 of second turn-up portion 122 does not contact downward extending third carcass ply 118 in the sidewall portion of the tire because second height $H_2$ is less than third height $H_3$. Instead, second turn-up portion 122 contacts third turn-up portion 124. In another embodiment (not shown), first turn-up end of first turn-up portion and third turn-up end of third turn-up portion may contact a radially downward extending third carcass ply, a flipper, or a bead filler.

A turn-up configuration in which a middle turn-up has a height less than two adjacent turn-ups may be described as a "staggered" formation. Likewise, a turn-up configuration in which a middle turn-up has a height greater than two adjacent turn-ups may also be described as a "staggered" formation. This configuration may prevent adjacent turn-up ends from propagating radially from one turn-up end to at least one adjacent turn-up end.

In one embodiment, the heights $H_1$, $H_2$, and $H_3$ of turn-up portions 120, 122, 124 are each between 10% and 70% of the section height $H_0$ (which is the radial distance from the outer tread surface at the equatorial plane $E_p$ to the base of the bead core 108). In an alternative embodiment, heights $H_1$, $H_2$, and $H_3$ of the turn-up portions 120, 122, 124 are each between 10% and 55% of the section height H. In one embodiment, height $H_1$ of first turn-up portion is between about 125 mm and about 280 mm, height $H_2$ of second turn-up portion is between about 70 mm and about 230 mm, and height $H_3$ of the third turn-up portion is between about 80 mm and about 230 mm.

In the illustrated embodiment, the radial distance between any two turn-up ends that are sequential in radial height, e.g., the highest and second highest, second highest and third highest, third highest and third lowest, second highest and second lowest, and the second lowest and the lowest, ranges from about 0 mm to about 20 mm. In another embodiment (not shown), the radial distance between any two turn-up ends that are sequential in radial height ranges from about 20 mm to about 40 mm. In yet another embodiment (not shown), the radial distance between any two turn-up ends that are sequential in radial height ranges from about 40 mm to about 60 mm. In another embodiment (not shown), the radial distance between any two turn-up ends that are sequential in radial height ranges from about 60 mm to about 80 mm. In yet another embodiment (not shown), the radial distance between any two turn-up ends that are sequential in radial height ranges from about 80 mm to about 100 mm.

With continued reference to FIG. 1, tire 100 further includes six belts 132a-f that extend circumferentially about tire 100. The belts 132a-f are provided below tread 102 and above first, second, and third carcass plies 114, 116, 118. Further, belts 132a-f terminate at edges 134a-f, respectively, at locations near a shoulder region 136 of tire 100. Although tire 100 illustrated in FIG. 1 features six belts, tire 100 can include less than six belts or more than six belts in alternative embodiments (not shown).

With continued reference to FIG. 1, tire 100 also includes a belt edge insert 138 provided in shoulder region 136 of tire 100 between edges 134a-f of the belts 132a-f, respectively, and first, second, and third carcass plies 114, 116, 118. Belt edge insert 138 extends circumferentially about tire 100, and has an inner end 140 disposed inward of edge 134a of the lowest belt 132a and an outer end 142 disposed outwards from edge 134a of the lowest belt 132a. Placement of the belt edge insert 138 in this location protects carcass plies 114, 116, 118 from the edges of belts 134a-f and maintains a flat, constant belt profile. Belt edge insert 138 may be constructed of extruded rubber. Alternatively, belt edge insert 138 may be constructed of another elastomeric material. In alternative embodiments (not shown), the belt edge insert 138 may be omitted.

As shown in FIG. 1, tire 100 also includes first and second shoulder inserts 144, 146 that extend circumferentially about tire 100. First shoulder insert 144 is provided between first carcass ply 114 and second carcass ply 116. Second shoulder insert 146 is provided between second carcass ply 116 and third carcass ply 118. In the illustrated embodiment, first and second shoulder inserts 144, 146 include upper ends 144a, 146a and lower ends 144b, 146b. Upper ends 144a, 146a of shoulder inserts 144, 146 terminate in the upper section U of tire 100 inward of six belts 132a-f. Further, lower ends 144b, 146b of shoulder inserts 144, 146 terminate in the upper section U of tire 100 radially below upper ends 144a, 146a. In an alternative embodiment, at least one of the lower ends 144b, 146b of shoulder inserts 144 146 terminate in the lower section L of tire 100. In another alternative embodiment, only one of the upper ends 144a, 146a of shoulder inserts 144, 146 terminates in the upper section U of tire 100 downward of belts 132a-f. In yet another alternative embodiment (not shown), shoulder inserts 144, 146 can extend from one sidewall to another sidewall, and have lower ends 144b, 146b that terminate in the lower section L or upper section U of tire 100. It should be understood that a tire can include less than two shoulder inserts or more than two shoulder inserts.

Figure 2:
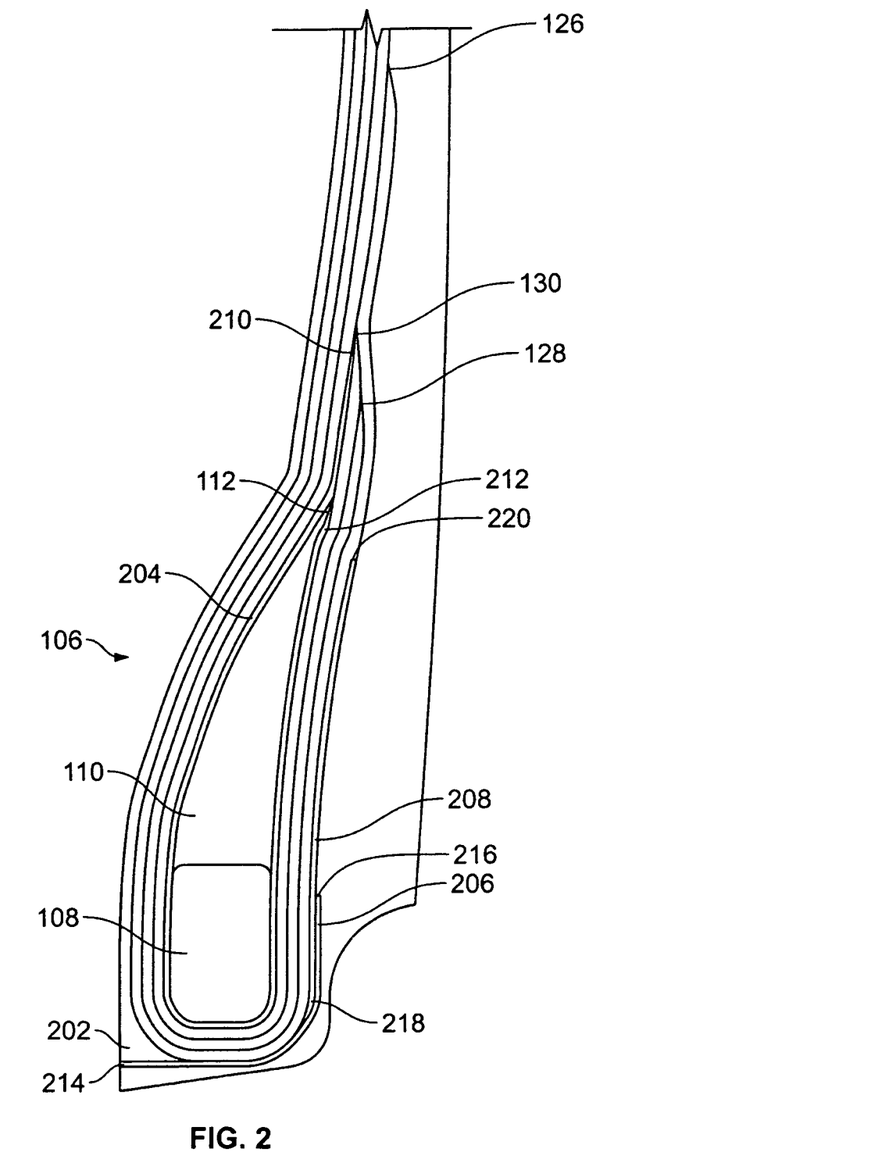
FIG. 2 is an enlarged cross-section of a portion of the tire of FIG. 1.

FIG. 2 is an enlarged cross-section of a portion of tire 100 of FIG. 1 depicting bead portion 106 in the lower section L of tire 100 in greater detail. Bead portion 106 further includes a portion of an inner liner 202, a flipper 204, a chafer 206, and a sidewall gum strip 208. Flipper 204, chafer 206, and sidewall gum strip 208 extend circumferentially about tire 100.

Flipper 204 includes a first end 210 and a second end 212. In the illustrated embodiment, first end 210 is above upper end 112 of bead filler 110 and extends downward along an inner perimeter of the bead filler 110, around a perimeter of the bead core 108, radially upward along an outer perimeter of the bead filler 110, and terminates at second end 212. The second end 212 is radially below the first end 210 and adjacent to upper end 112 of bead filler 110. In an embodiment (not shown), flipper 204 includes a first end 210 that is below and in proximity to upper end 112 and extends downward along an inner perimeter of the bead filler 110, around a perimeter of the bead core 108, upward along an outer perimeter of the bead filler 110 and terminates at a second end 212, radially above first end 210. In another alternative embodiment (not shown), second end 212 terminates radially above upper end 112 of bead filler 110. In yet another alternative embodiment (not shown), second end 212 terminates below upper end 112 of bead filler 110. In still another alternative embodiment (not shown), first end 210 may be inward of bead filler upper end 112. In another embodiment (not shown), tire 100 does not include a flipper.

Flipper 204 may be constructed of fabric, rubber, or fabric and rubber, providing a cushion between the bead filler 108 and the first, second, and third carcass plies 114, 116, 118.

As shown in FIG. 2, chafer 206 includes a first end 214 axially adjacent to inner liner 202. The chafer 206 extends outward from inner liner 202, below bead core 108 and carcass plies 114, 116, 118, and curves upward around bead core 108 and carcass plies 114, 116, 118, terminating outward of the sidewall gum strip 208 at second end 216. In the illustrated embodiment, second end 216 of chafer 206 is located below the bead filler 110. In an alternative embodiment (not shown), second end 216 of chafer 206 is located above bead core 108. In yet another alternative embodiment (not shown), first end 214 of chafer 206 is located between inner liner 202 and carcass plies 114, 116, 118, inward of bead core 108 and above second end 216 so chafer 206 includes two curved portions that curve upward on each side of bead core 108.

Chaffer 206 may be constructed of nylon, polyester, rubber, or the like.

With continued reference to FIG. 2, the sidewall gum strip 208 is located axially between third turn-up portion 124 and a portion of chafer 206. The sidewall gum strip begins at first end 218, located below the second end 216 of chafer 206, and extends upward, terminating at a second end 220, located below the first and second ends 210, 212 of flipper 204 and upper end 112 of bead filler 110. In one embodiment, second end 220 is located about 80 mm to about 125 mm above first end 218.

In an alternative embodiment (not shown), second end 220 is located above upper end 112 of bead filler 110. In another alternative embodiment (not shown), first end 218 of sidewall gum strip 208 is outward of second end 216 of chafer 206. In yet another alternative embodiment (not shown), second end 220 is located above upper end 112 of bead filler 110.

Figure 3:
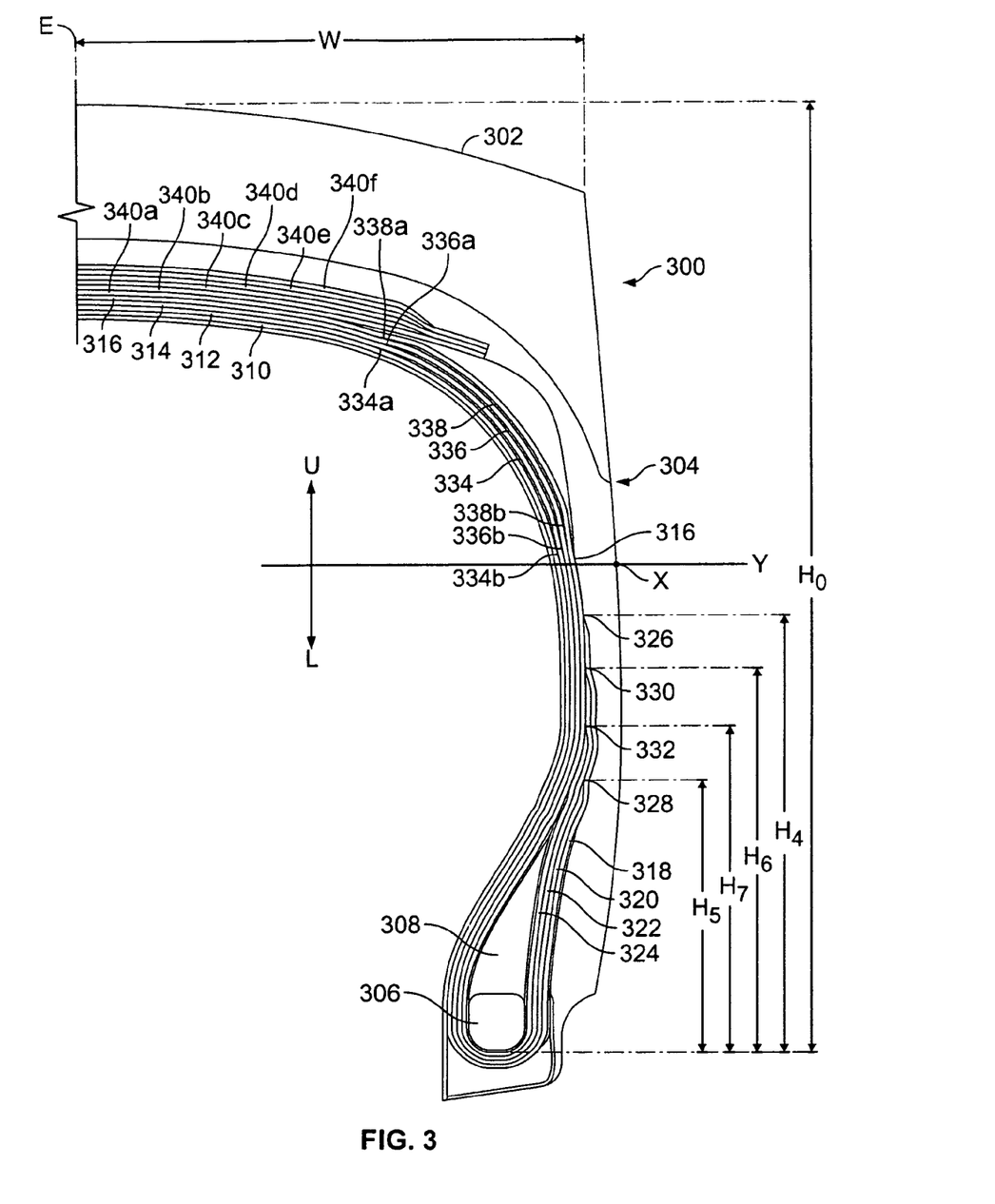
FIG. 3 illustrates a partial cross-section of one embodiment of a tire having four turn-ups.

FIG. 3 is a cross-sectional view of a quadrant of one embodiment of a tire 300 having a tread 302, a sidewall 304, a bead core 306, and a bead filler 308. Tire 300 is substantially the same as tire 100 illustrated in FIGS. 1-2, except for the design of the carcass plies, shoulder inserts, turn-ups, and turn-up ends.

In the illustrated embodiment, tire 300 includes first, second, third, and fourth carcass plies 310, 312, 314, and 316 that extend downward, inward of the bead filler 308, extend around the bead core 306, and continue upward, outward of the bead filler 308 towards the tread 302 to form first, second, third, and fourth turn-up portions 318, 320, 322, 324, respectively. Each turn-up portion 318, 320, 322, 324 terminates at first, second, third, and fourth turn-up ends 326, 328, 330, 332, respectively.

First turn-up portion 318 of first carcass ply 310 has a first height $H_4$. Second turn-up portion 320 of second carcass ply 312 has a second height $H_5$. Third turn-up portion 322 of third carcass ply 314 has a third height $H_6$. Fourth turn-up portion 324 of fourth carcass ply 316 has a fourth height $H_7$.

In the illustrated embodiment, second height $H_5$ is less than fourth height $H_7$, which is less than third height $H_6$, which is less than first height $H_4$. First turn-up end 326 of first turn-up portion 318, third turn-up end 330 of third turn-up portion 322, and fourth turn-up end 332 of fourth turn-up portion 324 contact radially downward extending fourth carcass ply 316 in sidewall 306 of the tire 300. Second turn-up end 328 of second turn-up portion 320 does not contact radially downward extending fourth carcass ply 316 in the sidewall 306 of tire 300. In another embodiment (not shown), first turn-up end of first turn-up portion, third turn-up end of third turn-up portion, and fourth turn-up end of fourth turn-up portion may contact a radially downward extending fourth carcass ply, a flipper, or a bead filler.

As shown in FIG. 3, tire 300 also includes first, second, and third shoulder inserts 334, 336, 338 that extend circumferentially about tire 300. First shoulder insert 334 is provided between first carcass ply 310 and second carcass ply 312. Second shoulder insert 336 is provided between second carcass ply 312 and third carcass ply 314. Third shoulder insert 338 is provided between third carcass ply 314 and fourth carcass ply 316. In the illustrated embodiment, first, second, and third shoulder inserts 334, 336, 338 include upper ends 334*a*, 336*a*, 338*a* and lower ends 334*b*, 336*b*, 338*b*. Upper ends 334*a*, 336*a*, 338*a* of shoulder inserts 334, 336, 338 terminate in the upper section U of tire 300 inward of six belts 340*a-f*. Further, lower ends 334*b*, 336*b*, 338*b* of shoulder inserts 334, 336, 338 terminate in the upper section U of tire 300 below upper ends 334*a*, 336*a*, 338*a*. In an alternative embodiment, at least one of the lower ends 334*b*, 336*b*, 338*b* of shoulder inserts 334, 336, 338 terminate in the lower section L of tire 300. In another alternative embodiment, only one of the upper ends 334*a*, 336*a*, 338*a* of shoulder inserts 334, 336, 338 terminates in the upper section U of tire 300 inward of belts 340*a-f*. In yet another alternative embodiment (not shown), shoulder inserts 334, 336, 338 can extend from one sidewall to another sidewall, and have lower ends 334*b*, 336*b*, 338*b* that terminate in the lower section L or upper section U of tire 300. Although tire 100 illustrated in FIG. 3 features three shoulder inserts, tire 300 can include less than three shoulder inserts or more than three shoulder inserts in alternative embodiments (not shown).

As described above, turn-up ends are staggered when not all of the turn-up ends make contact with a radially downward extending carcass ply in one of the sidewalls of the tire because at least one turn-up end is outward and below at least one turn-up end and inward and below at least one other turn-up end. Likewise, a turn-up configuration in which a middle turn-up has a height greater than two adjacent turn-ups may also be described as a "staggered" formation. Generally, the first and the last turn-up ends contact a radially downward extending carcass plies. In other words, the 1st and nth plies contact a radially downward extending carcass ply, wherein n is equal to the total number of carcass plies in the tire. Therefore, the number of turn-up ends that do not contact at least one radially downward extending carcass ply is never greater than n−2. Further, the first carcass ply has the highest turn-up end. In another embodiment (not shown), an outermost turn-up end does not contact the radially downward extending carcass plies. In yet another embodiment (not shown), an outermost turn-up end is not the radially highest turn-up end. In another embodiment (not shown), at least two turn-up ends contact a radially downward extending carcass ply, a flipper, or a bead filler In another embodiment (not shown), turn-up ends are staggered when not all of the turn-up ends make contact with a boundary line in one of the sidewalls of the tire and at least two turn-up ends have different radial heights, wherein the boundary line is a line drawn from a highest turn-up end that contacts the boundary line, extending downward and contacting other turn-up ends that are above a bead filler or a flipper, and extending downward along an outer edge of the bead filler or the flipper.

The following TABLE 1 lists ten alternative embodiments of tire 300 having four carcass plies, four turn-up portions, and four turn-up ends, wherein the turn-up ends have different radial heights and not all of the turn-up ends contact radially downward extending carcass ply 316. One skilled in the art would understand that the embodiments listed in Table 1 are only examples and not limiting. In the table below, turn-up end numbers 1-4 are listed in descending order from highest, $2^{nd}$ highest, $2^{nd}$ lowest, to lowest radial height. Each turn-up end is indicated as contacting a radially downward extending carcass ply or not contacting a radially downward extending carcass ply. For example, "1-on" denotes that the first turn-up end contacts radially downward extending carcass ply and "3-off" denotes that the third turn-up end does not contact radially downward extending carcass ply.

TABLE 1

| | Embodiment # | | | | |
|---|---|---|---|---|---|
| | 1 | 2 | 3 | 4 | 5 |
| Highest turn-up end | 1-on | 1-on | 1-on | 1-on | 1-on |
| 2nd Highest turn-up end | 2-on | 3-on | 3-on | 4-on | 4-on |
| 2nd Lowest turn-up end | 4-on | 2-off | 4-on | 2-off | 3-off |
| Lowest turn-up end | 3-off | 4-on | 2-off | 3-off | 2-off |

| | Embodiment # | | | | |
|---|---|---|---|---|---|
| | 6 | 7 | 8 | 9 | 10 |
| Highest turn-up end | 2-on | 3-on | 3-on | 4-on | 4-on |
| 2nd Highest turn-up end | 1-off | 1-off | 1-off | 1-off | 1-off |
| 2nd Lowest turn-up end | 4-on | 2-off | 4-on | 2-off | 3-off |
| Lowest turn-up end | 3-off | 4-on | 2-off | 3-off | 2-off |

TABLE 1 lists three embodiments where one of the four turn-up ends does not contact a radially downward extending carcass ply, lists five embodiments where two of the four turn-up ends do not contact a radially downward extending carcass ply, and lists two embodiments where three of the four turn-up ends do not contact a radially downward extending carcass ply. For example, in embodiment #1 one turn-up end does not make contact with a downward extending carcass ply. Specifically, first turn-up end of first turn-up portion, second turn-up end of second turn-up portion, and fourth turn-up end of fourth turn-up portion contact radially downward extending fourth carcass ply in sidewall of the tire, and third turn-up end of third turn-up portion, does not contact radially downward extending fourth carcass ply. In embodiment #5, two turn-up ends do not make contact with a downward extending carcass ply. Specifically, first turn-up end of first turn-up portion and fourth turn-up end of fourth turn-up portion contact radially downward extending fourth carcass ply in sidewall of the tire, and second turn-up end of second turn-up portion and third turn-up end of third turn-up portion do not contact radially downward extending fourth carcass ply. In another embodiment (not shown), at least one turn-up end contacts (i.e., "on,") a radially downward extending carcass ply, a flipper, or a bead filler.

Figure 4:
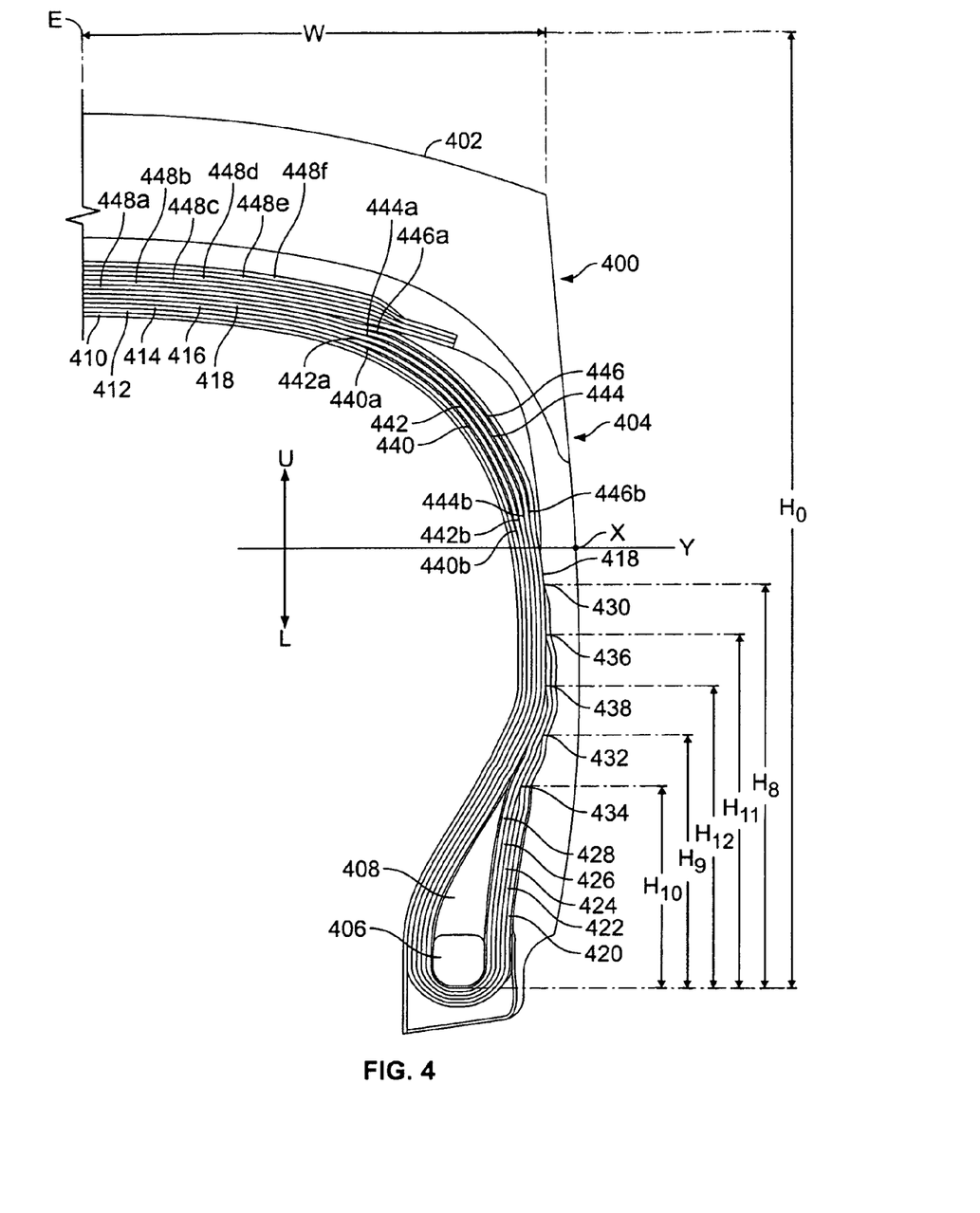
FIG. 4 illustrates a partial cross-section of one embodiment of a tire having five turn-ups.

FIG. 4 is a cross-sectional view of a quadrant of one embodiment of a tire 400 having a tread 402, a sidewall 404, a bead core 406, and a bead filler 408. Tire 400 is substantially identical to the tire 100 illustrated in FIGS. 1-2, except for the design of the carcass plies, shoulder inserts, turn-ups, and turn-up ends. In the illustrated embodiment, tire 400 includes first, second, third, fourth, and fifth carcass plies 410, 412, 414, 416, and 418 that extend radially downward, inward of the bead filler 408, extend around the bead core 406, and continue radially upward, outward of the bead filler 408 and extend upwardly towards the tread 402 to form first, second, third, fourth, and fifth turn-up portions 420, 422, 424, 426, 428, respectively. Each turn-up portion 420, 422, 424, 426, 428 terminates at first, second, third, fourth, and fifth turn-up ends 430, 432, 434, 436, 438, respectively.

First turn-up portion 420 of first carcass ply 410 has a first height $H_8$. Second turn-up portion 422 of second carcass ply 412 has a second height $H_9$. Third turn-up portion 424 of third carcass ply 414 has a third height $H_{10}$. Fourth turn-up portion 426 of fourth carcass ply 416 has a fourth height $H_{11}$. Fifth turn-up portion 428 of fifth carcass ply 418 has a fifth height $H_{12}$.

In the illustrated embodiment, third height $H_{10}$ is less than second height $H_9$, which is less than fifth height $H_{12}$, which is less than fourth height $H_{11}$, which is less than first height $H_8$. First turn-up end 430 of first turn-up portion 420, fourth turn-up end 436 of fourth turn-up portion 426, and fifth turn-up end 438 of fifth turn-up portion 428 contact radially downward extending fifth carcass ply 418 in sidewall 404 of the tire 400. Second turn-up end 432 of second turn-up portion 422 and third turn-up end 434 of third turn-up portion 424 do not contact radially downward extending fifth carcass ply 418 in sidewall 404 of tire 400.

As shown in FIG. 4, tire 400 also includes first, second, third, and fourth shoulder inserts 440, 442, 444, 446 that extend circumferentially about tire 400. First shoulder insert 440 is provided between first carcass ply 410 and second carcass ply 412. Second shoulder insert 442 is provided between second carcass ply 412 and third carcass ply 414. Third shoulder insert 444 is provided between third carcass ply 414 and fourth carcass ply 416. Fourth shoulder insert 446 is provided between fourth carcass ply 416 and fifth carcass ply 418. The shoulder inserts are positioned in the same manner described above in FIGS. 1 and 2. Although tire 400 illustrated in FIG. 4 features four shoulder inserts, tire 400 can include less than four shoulder inserts or more than four shoulder inserts in alternative embodiments (not shown).

The following TABLE 2 lists twenty-three alternative embodiments of tire 400 having five carcass plies, five turn-up portions, and five turn-up ends, wherein the turn-up ends have different radial heights and not all of the turn-up ends contact radially downward extending carcass ply 418. One skilled in the art would understand that the embodiments listed in Table 2 are only examples and not limiting. In the table below, turn-up end numbers 1-5 are listed in descending order from highest to lowest radial height, and each turn-up end is indicated as contacting a radially downward extending carcass ply (i.e., "on,"), or not contacting a radially downward extending carcass ply (i.e., "off").

TABLE 2

| | Embodiment # | | | | | | | |
|---|---|---|---|---|---|---|---|---|
| | 1 | 2 | 3 | 4 | 5 | 6 | 7 | 8 |

TABLE 2-continued

|  | | | | | | | | |
|---|---|---|---|---|---|---|---|---|
| Highest turn-up end | 1-on | 1-on | 1-on | 1-on | 1-on | 1-on | 1-on | 1-on |
| $2^{nd}$ highest turn-up end | 2-on | 2-on | 2-on | 2-on | 2-on | 3-on | 3-on | 3-on |
| 3rd highest turn-up end | 3-on | 4-on | 4-on | 5-on | 5-on | 2-off | 2-off | 4-on |
| $2^{nd}$ lowest turn-up end | 5-on | 3-off | 5-on | 4-off | 3-off | 4-on | 5-on | 5-on |
| Lowest turn-up end | 4-off | 5-on | 3-off | 3-off | 4-off | 5-on | 4-off | 2-off |

| | Embodiment # | | | | | | | |
|---|---|---|---|---|---|---|---|---|
| | 9 | 10 | 11 | 12 | 13 | 14 | 15 | 16 |
| Highest turn-up end | 1-on | 1-on | 1-on | 1-on | 1-on | 1-on | 1-on | 1-on |
| $2^{nd}$ highest turn-up end | 3-on | 3-on | 3-on | 4-on | 4-on | 4-on | 4-on | 4-on |
| 3rd highest turn-up end | 4-on | 5-on | 5-on | 2-off | 2-off | 3-off | 3-off | 5-on |
| $2^{nd}$ lowest turn-up end | 2-off | 2-off | 4-off | 3-off | 5-on | 2-off | 5-on | 2-off |
| Lowest turn-up end | 5-on | 4-off | 2-off | 5-on | 3-off | 5-on | 2-off | 3-off |

| | Embodiment # | | | | | | |
|---|---|---|---|---|---|---|---|
| | 17 | 18 | 19 | 20 | 21 | 22 | 23 |
| Highest turn-up end | 1-on | 1-on | 1-on | 1-on | 1-on | 1-on | 1-on |
| $2^{nd}$ highest turn-up end | 4-on | 5-on | 5-on | 5-on | 5-on | 5-on | 5-on |
| 3rd highest turn-up end | 5-on | 2-off | 2-off | 3-off | 3-off | 4-off | 4-off |
| $2^{nd}$ lowest turn-up end | 3-off | 3-off | 4-off | 2-off | 4-off | 2-off | 3-off |
| Lowest turn-up end | 2-off | 4-off | 3-off | 4-off | 2-off | 3-off | 2-off |

TABLE 2 lists six embodiments where one of the five turn-up ends does not contact a radially downward extending carcass ply, eleven embodiments where two of the five turn-up ends do not contact a radially downward extending carcass ply, and six embodiments where three of the five turn-up ends do not contact a radially downward extending carcass ply. In embodiment #17, two turn-up ends do not make contact with a downward extending carcass ply. Specifically, first turn-up end of first turn-up portion, fourth turn-up end of fourth turn-up portion, and fifth turn-up end of fifth turn-up portion contact radially downward extending fifth carcass ply in sidewall of the tire, and second turn-up end of second turn-up portion and third turn-up end of third turn-up portion do not contact radially downward extending fifth carcass ply. In another embodiment (not shown), at least one turn-up end contacts (i.e., "on,") a radially downward extending carcass ply, a flipper, or a bead filler.

Figure 5:
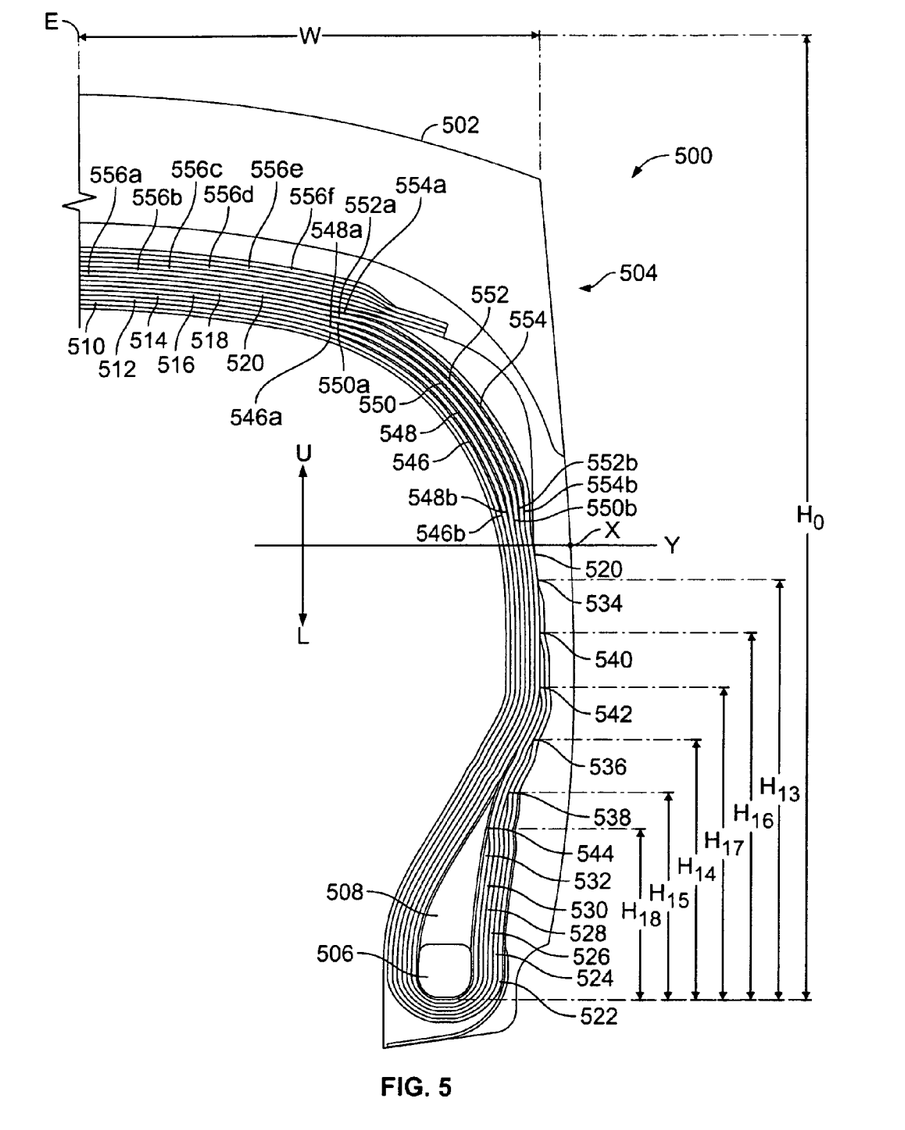
FIG. 5 illustrates a partial cross-section of one embodiment of a tire having six turn-ups.

FIG. 5 is a cross-sectional view of a quadrant of one embodiment of a tire 500 having a tread 502, a sidewall 504, a bead core 506, and a bead filler 508. Tire 500 is substantially identical to the tire 100 illustrated in FIGS. 1-2, except for the design of the carcass plies, shoulder inserts, turn-ups, and turn-up ends. In the illustrated embodiment, tire 500 includes first, second, third, fourth, fifth, and sixth carcass plies 510, 512, 514, 516, 518, 520 that extend radially downward, inward of the bead filler 508, extend around the bead core 506, and continue radially upward, outward of the bead filler 508 and extend upwardly towards the tread 502 to form first, second, third, fourth, fifth, and sixth turn-up portions 522, 524, 526, 528, 530, 532, respectively. Each turn-up portion 522, 524, 526, 528, 530, 532 terminates at first, second, third, fourth, fifth, and sixth turn-up ends 534, 536, 538, 540, 542, 544, respectively.

With continued reference to the embodiment illustrated in FIG. 5, first turn-up portion 522 of first carcass ply 510 has a first height $H_{13}$. Second turn-up portion 524 of second carcass ply 512 has a second height $H_{14}$. Third turn-up portion 526 of third carcass ply 514 has a third height $H_{15}$. Fourth turn-up portion 528 of fourth carcass ply 516 has a fourth height $H_{16}$. Fifth turn-up portion 530 of fifth carcass ply 518 has a fifth height $H_{17}$. Sixth turn-up portion 532 of sixth carcass ply 520 has a sixth height $H_{18}$.

In the illustrated embodiment, sixth height $H_{18}$ is less than third height $H_{15}$, which is less than second height $H_{14}$, which is less than fifth height $H_{17}$, which is less than fourth height $H_{16}$, which is less than first height $H_{13}$. First turn-up end 534 of first turn-up portion 522, fourth turn-up end 542 of fourth turn-up portion 530, and fifth turn-up end 540 of fifth turn-up portion 530 contact radially downward extending sixth carcass ply 520 in sidewall 504 of the tire 500. Sixth turn-up end 544 of sixth turn-up portion 532 contacts adjacent flipper. Second turn-up end 536 of second turn-up portion 524 and third turn-up end 538 of third turn-up portion 526 do not contact radially downward extending sixth carcass ply 520 in the sidewall 504 of tire 500. In another embodiment (not shown), the sixth turn-up end 544 of sixth turn-up portion 532 contacts radially downward extending sixth carcass ply 520 in sidewall 504 of the tire 500. In yet another embodiment (not shown), at least two turn-up ends contact an adjacent bead filler or flipper.

As shown in FIG. 5, tire 500 also includes first, second, third, fourth, and fifth shoulder inserts 546, 548, 550, 552, 554 that extend circumferentially about tire 500. First shoulder insert 546 is provided between first carcass ply 510 and second carcass ply 512. Second shoulder insert 548 is provided between second carcass ply 512 and third carcass ply 514. Third shoulder insert 550 is provided between third carcass ply 514 and fourth carcass ply 516. Fourth shoulder insert 552 is provided between fourth carcass ply 516 and fifth carcass ply 518. Fifth shoulder insert 554 is provided between fifth carcass ply 518 and sixth carcass ply 520. The shoulder inserts are positioned in the same manner described above in FIGS. 1 and 2. Although tire 500 illustrated in FIG. 5 features five shoulder inserts, tire 500 can include less than five shoulder inserts or more than five shoulder inserts in alternative embodiments (not shown).

The following TABLE 3 lists one-hundred and nineteen alternative embodiments of tire 500 having six carcass plies, six turn-up portions, and six turn-up ends, wherein the turn-up ends have different radial heights and not all of the turn-up ends contact a radially downward extending carcass ply 520. One skilled in the art would understand that the embodiments listed in Table 3 are only examples and not limiting. In the table below, turn-up end numbers 1-6 are listed in descending order from highest to lowest radial height, and each turn-up end is indicated as contacting a radially downward extending carcass ply or not contacting a radially downward extending carcass ply (as discussed above).

TABLE 3

| | Embodiment # | | | | | | | |
|---|---|---|---|---|---|---|---|---|
| | 1 | 2 | 3 | 4 | 5 | 6 | 7 | 8 |
| Highest turn-up end | 1-on | 1-on | 1-on | 1-on | 1-on | 1-on | 1-on | 1-on |
| $2^{nd}$ highest turn-up end | 2-on | 2-on | 2-on | 2-on | 2-on | 2-on | 2-on | 2-on |
| 3rd highest turn-up end | 3-on | 3-on | 3-on | 3-on | 3-on | 4-on | 4-on | 4-on |
| 3rd lowest turn-up end | 4-on | 5-on | 5-on | 6-on | 6-on | 3-off | 3-off | 5-on |
| $2^{nd}$ lowest turn-up end | 6-on | 4-off | 6-on | 4-off | 5-off | 5-on | 6-on | 3-off |
| Lowest turn-up end | 5-off | 6-on | 4-off | 5-off | 4-off | 6-on | 5-off | 6-on |

| | Embodiment # | | | | | | | |
|---|---|---|---|---|---|---|---|---|
| | 9 | 10 | 11 | 12 | 13 | 14 | 15 | 16 |
| Highest turn-up end | 1-on | 1-on | 1-on | 1-on | 1-on | 1-on | 1-on | 1-on |
| $2^{nd}$ highest turn-up end | 2-on | 2-on | 2-on | 2-on | 2-on | 2-on | 2-on | 2-on |
| 3rd highest turn-up end | 4-on | 4-on | 4-on | 5-on | 5-on | 5-on | 5-on | 5-on |
| 3rd lowest turn-up end | 5-on | 6-on | 6-on | 3-off | 3-off | 4-off | 4-off | 6-on |
| $2^{nd}$ lowest turn-up end | 6-on | 3-off | 5-off | 4-off | 6-on | 3-off | 6-on | 3-off |
| Lowest turn-up end | 3-off | 5-off | 3-off | 6-on | 4-off | 6-on | 3-off | 4-off |

| | Embodiment # | | | | | | | |
|---|---|---|---|---|---|---|---|---|
| | 17 | 18 | 19 | 20 | 21 | 22 | 23 | 24 |
| Highest turn-up end | 1-on | 1-on | 1-on | 1-on | 1-on | 1-on | 1-on | 1-on |
| $2^{nd}$ highest turn-up end | 2-on | 2-on | 2-on | 2-on | 2-on | 2-on | 2-on | 3-on |
| 3rd highest turn-up end | 5-on | 6-on | 6-on | 6-on | 6-on | 6-on | 6-on | 2-off |
| 3rd lowest turn-up end | 6-on | 3-off | 3-off | 4-off | 4-off | 5-off | 5-off | 4-on |
| $2^{nd}$ lowest turn-up end | 4-off | 4-off | 5-off | 3-off | 5-off | 3-off | 4-off | 5-on |
| Lowest turn-up end | 3-off | 5-off | 4-off | 5-off | 3-off | 4-off | 3-off | 6-on |

| | Embodiment # | | | | | | | |
|---|---|---|---|---|---|---|---|---|
| | 25 | 26 | 27 | 28 | 29 | 30 | 31 | 32 |
| Highest turn-up end | 1-on | 1-on | 1-on | 1-on | 1-on | 1-on | 1-on | 1-on |
| $2^{nd}$ highest turn-up end | 3-on | 3-on | 3-on | 3-on | 3-on | 3-on | 3-on | 3-on |
| 3rd highest turn-up end | 2-off | 2-off | 2-off | 2-off | 2-off | 4-on | 4-on | 4-on |
| 3rd lowest turn-up end | 4-on | 5-on | 5-on | 6-on | 6-on | 2-off | 2-off | 5-on |
| $2^{nd}$ lowest turn-up end | 6-on | 4-off | 6-on | 4-off | 5-off | 5-on | 6-on | 2-off |
| Lowest turn-up end | 5-off | 6-on | 4-off | 5-off | 4-off | 6-on | 5-off | 6-on |

| | Embodiment # | | | | | | | |
|---|---|---|---|---|---|---|---|---|
| | 33 | 34 | 35 | 36 | 37 | 38 | 39 | 40 |
| Highest turn-up end | 1-on | 1-on | 1-on | 1-on | 1-on | 1-on | 1-on | 1-on |
| $2^{nd}$ highest turn-up end | 3-on | 3-on | 3-on | 3-on | 3-on | 3-on | 3-on | 3-on |
| 3rd highest turn-up end | 4-on | 4-on | 4-on | 5-on | 5-on | 5-on | 5-on | 5-on |
| 3rd lowest turn-up end | 5-on | 6-on | 6-on | 2-off | 2-off | 4-off | 4-off | 6-on |
| $2^{nd}$ lowest turn-up end | 6-on | 2-off | 5-off | 4-off | 6-on | 2-off | 6-on | 2-off |
| Lowest turn-up end | 2-off | 5-off | 2-off | 6-on | 4-off | 6-on | 2-off | 4-off |

| | Embodiment # | | | | | | | |
|---|---|---|---|---|---|---|---|---|
| | 41 | 42 | 43 | 44 | 45 | 46 | 47 | 48 |
| Highest turn-up end | 1-on | 1-on | 1-on | 1-on | 1-on | 1-on | 1-on | 1-on |
| $2^{nd}$ highest turn-up end | 3-on | 3-on | 3-on | 3-on | 3-on | 3-on | 3-on | 4-on |
| 3rd highest turn-up end | 5-on | 6-on | 6-on | 6-on | 6-on | 6-on | 6-on | 2-off |
| 3rd lowest turn-up end | 6-on | 2-off | 2-off | 4-off | 4-off | 5-off | 5-off | 3-off |
| $2^{nd}$ lowest turn-up end | 4-off | 4-off | 5-off | 2-off | 5-off | 2-off | 4-off | 5-on |
| Lowest turn-up end | 2-off | 5-off | 4-off | 5-off | 2-off | 4-off | 2-off | 6-on |

| | Embodiment # | | | | | | | |
|---|---|---|---|---|---|---|---|---|
| | 49 | 50 | 51 | 52 | 53 | 54 | 55 | 56 |
| Highest turn-up end | 1-on | 1-on | 1-on | 1-on | 1-on | 1-on | 1-on | 1-on |
| $2^{nd}$ highest turn-up end | 4-on | 4-on | 4-on | 4-on | 4-on | 4-on | 4-on | 4-on |
| 3rd highest turn-up end | 2-off | 2-off | 2-off | 2-off | 2-off | 3-off | 3-off | 3-off |
| 3rd lowest turn-up end | 3-off | 5-on | 5-on | 6-on | 6-on | 2-off | 2-off | 5-on |
| $2^{nd}$ lowest turn-up end | 6-on | 3-off | 6-on | 3-off | 5-off | 5-on | 6-on | 2-off |
| Lowest turn-up end | 5-off | 6-on | 3-off | 5-off | 3-off | 6-on | 5-off | 6-on |

TABLE 3-continued

| | Embodiment # | | | | | | | |
|---|---|---|---|---|---|---|---|---|
| | 57 | 58 | 59 | 60 | 61 | 62 | 63 | 64 |
| Highest turn-up end | 1-on | 1-on | 1-on | 1-on | 1-on | 1-on | 1-on | 1-on |
| $2^{nd}$ highest turn-up end | 4-on | 4-on | 4-on | 4-on | 4-on | 4-on | 4-on | 4-on |
| 3rd highest turn-up end | 3-off | 3-off | 3-off | 5-on | 5-on | 5-on | 5-on | 5-on |
| 3rd lowest turn-up end | 5-on | 6-on | 6-on | 2-off | 2-off | 3-off | 3-off | 2-off |
| $2^{nd}$ lowest turn-up end | 6-on | 2-off | 5-off | 3-off | 6-on | 2-off | 6-on | 6-on |
| Lowest turn-up end | 2-off | 5-off | 2-off | 6-on | 3-off | 6-on | 2-off | 3-off |

| | Embodiment # | | | | | | | |
|---|---|---|---|---|---|---|---|---|
| | 65 | 66 | 67 | 68 | 69 | 70 | 71 | 72 |
| Highest turn-up end | 1-on | 1-on | 1-on | 1-on | 1-on | 1-on | 1-on | 1-on |
| $2^{nd}$ highest turn-up end | 4-on | 4-on | 4-on | 4-on | 4-on | 4-on | 4-on | 5-on |
| 3rd highest turn-up end | 5-on | 6-on | 6-on | 6-on | 6-on | 6-on | 6-on | 2-off |
| 3rd lowest turn-up end | 6-on | 2-off | 2-off | 3-off | 3-off | 5-off | 5-off | 3-off |
| $2^{nd}$ lowest turn-up end | 3-off | 3-off | 5-off | 2-off | 5-off | 2-off | 3-off | 4-off |
| Lowest turn-up end | 2-off | 5-off | 3-off | 5-off | 2-off | 3-off | 2-off | 6-on |

| | Embodiment # | | | | | | | |
|---|---|---|---|---|---|---|---|---|
| | 73 | 74 | 75 | 76 | 77 | 78 | 79 | 80 |
| Highest turn-up end | 1-on | 1-on | 1-on | 1-on | 1-on | 1-on | 1-on | 1-on |
| $2^{nd}$ highest turn-up end | 5-on | 5-on | 5-on | 5-on | 5-on | 5-on | 5-on | 5-on |
| 3rd highest turn-up end | 2-off | 2-off | 2-off | 2-off | 2-off | 3-off | 3-off | 3-off |
| 3rd lowest turn-up end | 3-off | 4-off | 4-off | 6-on | 6-on | 2-off | 2-off | 4-off |
| $2^{nd}$ lowest turn-up end | 6-on | 3-off | 6-on | 3-off | 4-off | 4-off | 6-on | 2-off |
| Lowest turn-up end | 4-off | 6-on | 3-off | 4-off | 3-off | 6-on | 4-off | 6-on |

| | Embodiment # | | | | | | | |
|---|---|---|---|---|---|---|---|---|
| | 81 | 82 | 83 | 84 | 85 | 86 | 87 | 88 |
| Highest turn-up end | 1-on | 1-on | 1-on | 1-on | 1-on | 1-on | 1-on | 1-on |
| $2^{nd}$ highest turn-up end | 5-on | 5-on | 5-on | 5-on | 5-on | 5-on | 5-on | 5-on |
| 3rd highest turn-up end | 3-off | 3-off | 3-off | 4-off | 4-off | 4-off | 4-off | 4-off |
| 3rd lowest turn-up end | 4-off | 6-on | 6-on | 2-off | 2-off | 3-off | 3-off | 6-on |
| $2^{nd}$ lowest turn-up end | 6-on | 2-off | 4-off | 3-off | 6-on | 2-off | 6-on | 2-off |
| Lowest turn-up end | 2-off | 4-off | 2-off | 6-on | 3-off | 6-on | 2-off | 3-off |

| | Embodiment # | | | | | | | |
|---|---|---|---|---|---|---|---|---|
| | 89 | 90 | 91 | 92 | 93 | 94 | 95 | 96 |
| Highest turn-up end | 1-on | 1-on | 1-on | 1-on | 1-on | 1-on | 1-on | 1-on |
| $2^{nd}$ highest turn-up end | 5-on | 5-on | 5-on | 5-on | 5-on | 5-on | 5-on | 6-on |
| 3rd highest turn-up end | 4-off | 6-on | 6-on | 6-on | 6-on | 6-on | 6-on | 2-off |
| 3rd lowest turn-up end | 6-on | 2-off | 2-off | 3-off | 3-off | 4-off | 4-off | 3-off |
| $2^{nd}$ lowest turn-up end | 3-off | 3-off | 4-off | 2-off | 4-off | 2-off | 3-off | 4-off |
| Lowest turn-up end | 2-off | 4-off | 3-off | 4-off | 2-off | 3-off | 2-off | 5-off |

| | Embodiment # | | | | | | | |
|---|---|---|---|---|---|---|---|---|
| | 97 | 98 | 99 | 100 | 101 | 102 | 103 | 104 |
| Highest turn-up end | 1-on | 1-on | 1-on | 1-on | 1-on | 1-on | 1-on | 1-on |
| $2^{nd}$ highest turn-up end | 6-on | 6-on | 6-on | 6-on | 6-on | 6-on | 6-on | 6-on |
| 3rd highest turn-up end | 2-off | 2-off | 2-off | 2-off | 2-off | 3-off | 3-off | 3-off |
| 3rd lowest turn-up end | 3-off | 4-off | 4-off | 5-off | 5-off | 2-off | 2-off | 4-off |
| $2^{nd}$ lowest turn-up end | 5-off | 3-off | 5-off | 3-off | 4-off | 4-off | 5-off | 2-off |
| Lowest turn-up end | 4-off | 5-off | 3-off | 4-off | 3-off | 5-off | 4-off | 5-off |

| | Embodiment # | | | | | | | |
|---|---|---|---|---|---|---|---|---|
| | 105 | 106 | 107 | 108 | 109 | 110 | 111 | 112 |
| Highest turn-up end | 1-on | 1-on | 1-on | 1-on | 1-on | 1-on | 1-on | 1-on |
| $2^{nd}$ highest turn-up end | 6-on | 6-on | 6-on | 6-on | 6-on | 6-on | 6-on | 6-on |
| 3rd highest turn-up end | 3-off | 3-off | 3-off | 4-off | 4-off | 4-off | 4-off | 4-off |
| 3rd lowest turn-up end | 4-off | 5-off | 5-off | 2-off | 2-off | 3-off | 3-off | 5-off |
| $2^{nd}$ lowest turn-up end | 5-off | 2-off | 4-off | 3-off | 5-off | 2-off | 5-off | 2-off |
| Lowest turn-up end | 2-off | 4-off | 2-off | 5-off | 3-off | 5-off | 2-off | 3-off |

| | Embodiment # | | | | | | |
|---|---|---|---|---|---|---|---|
| | 113 | 114 | 115 | 116 | 117 | 118 | 119 |

TABLE 3-continued

| | | | | | | | |
|---|---|---|---|---|---|---|---|
| Highest turn-up end | 1-on | 1-on | 1-on | 1-on | 1-on | 1-on | 1-on |
| $2^{nd}$ highest turn-up end | 6-on | 6-on | 6-on | 6-on | 6-on | 6-on | 6-on |
| 3rd highest turn-up end | 4-off | 5-off | 5-off | 5-off | 5-off | 5-off | 5-off |
| 3rd lowest turn-up end | 5-off | 2-off | 2-off | 3-off | 3-off | 4-off | 4-off |
| $2^{nd}$ lowest turn-up end | 3-off | 3-off | 4-off | 2-off | 4-off | 2-off | 3-off |
| Lowest turn-up end | 2-off | 4-off | 3-off | 4-off | 2-off | 3-off | 2-off |

TABLE 3 lists eleven embodiments where one of the six turn-up ends does not contact a radially downward extending carcass ply, thirty-four embodiments where two of the six turn-up ends do not contact a radially downward extending carcass ply, fifty embodiments where three of the six turn-up ends do not contact a radially downward extending carcass ply, and twenty-four embodiments where four of the six turn-up ends do not contact a radially downward extending carcass ply. For example, embodiment #14 lists an embodiment where two turn-up ends do not make contact with a downward extending carcass ply. Specifically, first turn-up end of first turn-up portion, second turn-up end of second turn-up portion, fifth turn-up end of fifth turn-up portion, and sixth turn-up end of sixth turn-up portion contact radially downward extending sixth carcass ply in sidewall of the tire, and third turn-up end of third turn-up portion and fourth turn-up end of fourth turn-up portion do not contact radially downward extending sixth carcass ply. In embodiment #108, first turn-up end of first turn-up portion and sixth turn-up end of sixth turn-up portion contact radially downward extending sixth carcass ply in sidewall of the tire, and second turn-up end of second turn-up portion, third turn-up end of third turn-up portion, fourth turn-up end of fourth turn-up portion, and fifth turn-up end of fifth turn-up portion do not contact radially downward extending sixth carcass ply.

A review of the embodiments in Table 3 illustrates that the first and the last turn-up ends can both be "on" or contact a radially downward extending carcass plies, e.g., the $1^{st}$ and $6^{th}$ or the $1^{st}$ and $n^{th}$. In another embodiment, the first turn-up end can be "off" or not contact a radially downward extending carcass ply. In another embodiment (not shown), at least one turn-up end contacts (i.e., "on,") a radially downward extending carcass ply, a flipper, or a bead filler.

Figure 6:
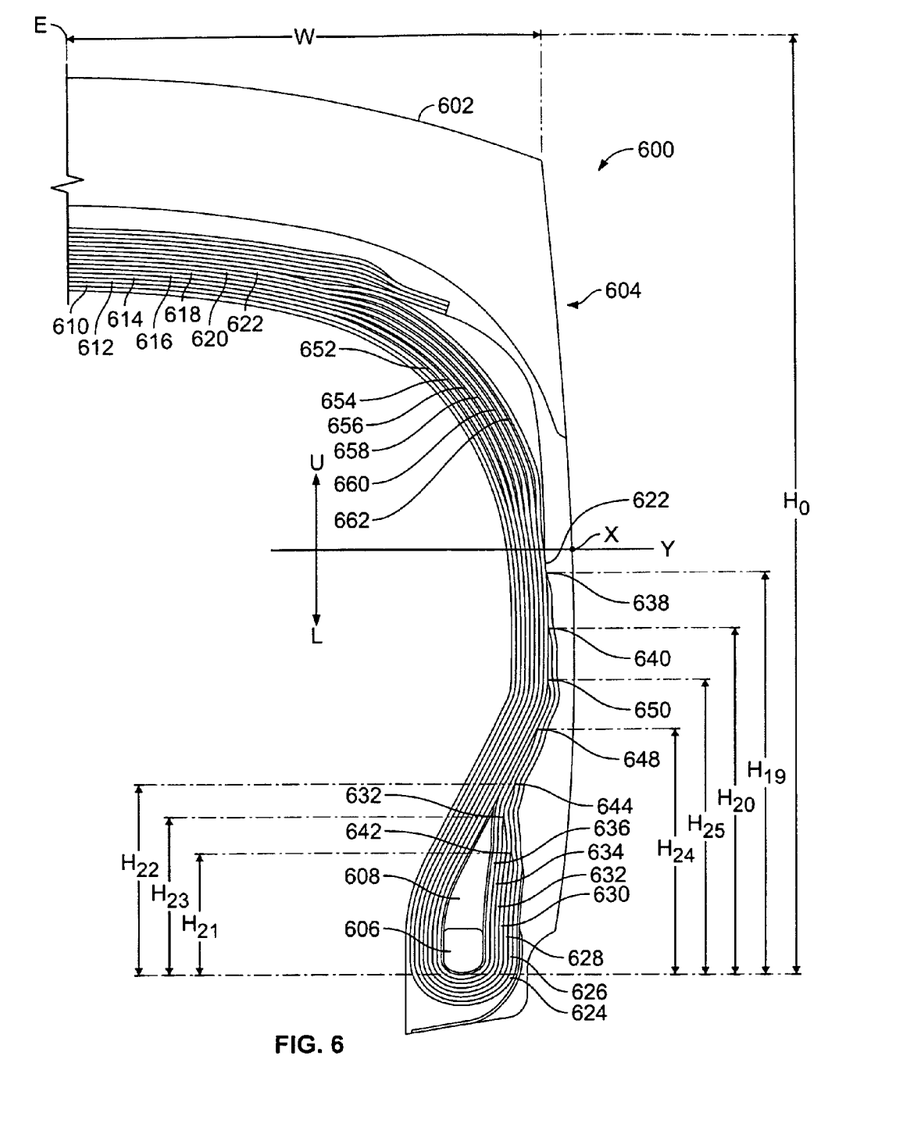
FIG. 6 illustrates a partial cross-section of one embodiment of a tire having seven turn-ups.

FIG. 6 is a cross-sectional view of a quadrant of one embodiment of a tire 600 having a tread 602, a sidewall 604, a bead core 606, and a bead filler 608. Tire 600 is substantially identical to the tire 100 illustrated in FIGS. 1-2, except for the design of the carcass plies, shoulder inserts, turn-ups, and turn-up ends. In the illustrated embodiment, tire 600 includes first, second, third, fourth, fifth, sixth, and seventh carcass plies 610, 612, 614, 616, 618, 620, and 622 that extend radially downward, inward of the bead filler 608, extend around the bead core 606, and continue radially upward, outward of the bead filler 608 and extend upwardly towards the tread 602 to form first, second, third, fourth, fifth, sixth, and seventh turn-up portions 624, 626, 628, 630, 632, 634, 636, respectively. Each turn-up portion 624, 626, 628, 630, 632, 634, 636 terminates at a first, second, third, fourth, fifth, sixth, and seventh turn-up end 638, 640, 642, 644, 646, 648, 650, respectively. In another embodiment (not shown), a tire can include more than seven carcass plies, more than seven turn-up portions, and more than seven turn-up ends.

First turn-up portion 624 of first carcass ply 610 has a first height $H_{19}$. Second turn-up portion 626 of second carcass ply 612 has a second height $H_{20}$. Third turn-up portion 628 of third carcass ply 614 has a third height $H_{21}$. Fourth turn-up portion 630 of fourth carcass ply 616 has a fourth height $H_{22}$. Fifth turn-up portion 632 of fifth carcass ply 618 has a fifth height $H_{23}$. Sixth turn-up portion 634 of sixth carcass ply 620 has a sixth height $H_{24}$. Seventh turn-up portion 636 of seventh carcass ply 622 has a seventh height $H_{25}$.

In the illustrated embodiment, third height $H_{21}$ is less than fifth height $H_{23}$, which is less than fourth height $H_{22}$, which is less than sixth height $H_{24}$, which is less than seventh height $H_{25}$, which is less than second height $H_{20}$, which is less than first height $H_{19}$. First turn-up end 638 of first turn-up portion 624, second turn-up end 640 of second turn-up portion 626, and seventh turn-up end 650 of seventh turn-up portion 636 contact radially downward extending seventh carcass ply 622 in sidewall 604 of tire 600. Sixth turn-up end 648 of second turn-up portion 634, fourth turn-up end 644 of fourth turn-up portion 630, fifth turn-up end 646 of fifth turn-up portion 632, and third turn-up end 642 of third turn-up portion 628 do not contact radially downward extending seventh carcass ply 622 in the sidewall 604 of tire 600. In another embodiment (not shown), first turn-up end of first turn-up portion and seventh turn-up end of seventh turn-up portion contact radially downward extending seventh carcass ply in sidewall of tire. Further, second turn-up end of second turn-up portion, third turn-up end of third turn-up portion, fourth turn-up end of fourth turn-up portion, fifth turn-up end of fifth turn-up portion, and sixth turn-up end of second turn-up portion do not contact radially downward extending seventh carcass ply in the sidewall of tire.

As shown in FIG. 6, tire 600 also includes first, second, third, fourth, fifth, and sixth shoulder inserts 652, 654, 656, 658, 660, 662 that extend circumferentially about tire 600. First shoulder insert 652 is provided between first carcass ply 610 and second carcass ply 612. Second shoulder insert 654 is provided between second carcass ply 612 and third carcass ply 614. Third shoulder insert 656 is provided between third carcass ply 614 and fourth carcass ply 616. Fourth shoulder insert 658 is provided between fourth carcass ply 616 and fifth carcass ply 618. Fifth shoulder insert 660 is provided between fifth carcass ply 618 and sixth carcass ply 620. Sixth shoulder insert 662 is provided between sixth carcass ply 620 and seventh carcass ply 622. The shoulder inserts are positioned in the same manner described above in FIGS. 1 and 2. Although tire 600 illustrated in FIG. 5 features six shoulder inserts, tire 600 can include less than six shoulder inserts or more than six shoulder inserts in alternative embodiments (not shown). In another embodiment (not shown), tire 600 can include more than seven carcass plies.

In another embodiment (not shown), one skilled in the art would appreciate that the combinations of staggered turn-ups ends for a tire with seven carcass plies would include a great number of variations. Specifically, the number of embodiments would be more than 719 embodiments and would include designs having 1 to 5 turn-up ends that would not contact a carcass ply in the sidewall. In another embodiment (not shown), the number of carcass plies can be greater than seven, and the number of staggered turn-up end embodiments would be greater than 719.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described above. Accordingly, departures may be made from such details without departing from the spirit or scope of the applicant's general inventive concept.

What is claimed is:

1. A tire having a section height, a maximum section width, an upper section above the maximum section width, and a lower section below the maximum section width, the tire comprising:
    a circumferential tread;
    at least one belt;
    a pair of sidewalls;
    an inner liner;
    a pair of bead portions, wherein each bead portion includes a bead core and a bead filler;
    a flipper having a first end axially inward of an upper end of the bead filler, extending from the first end radially downward along an axially inner perimeter of the bead filler and around a perimeter of the bead core, continuing radially upward along an axially outer perimeter of the bead filler, and terminating at a second end axially outward of the upper end of the bead filler;
    at least three carcass plies extending circumferentially about the tire from one bead portion to the other,
        wherein the at least three carcass plies extend radially downward, inward of the bead filler, extend around the bead core, and continue upward, outward of the bead filler and terminate in at least three turn-up ends,
        wherein the at least three carcass plies include a first, second, third, and fourth carcass ply having first, second, third, and fourth turn-up ends,
        wherein at least two turn-up ends do not contact at least one of the radially downward extending carcass plies in one of the sidewalls,
        wherein at least two of the turn-up ends contact at least one of the radially downward extending carcass plies in one of the sidewalls, the at least two of the turn-up ends including an innermost turn-up end and an outermost turn-up end,
        wherein the first turn-up end and fourth turn-up end contact at least one of the radially downward extending carcass plies in one of the sidewalls,
        wherein the second turn-up end and third turn-up end do not contact at least one of the radially downward extending carcass plies in one of the sidewalls,
        wherein the second turn-up end is outward and below the third turn-up end, and
        wherein the third turn-up end is outward and below the fourth turn-up end and inward and below the first turn-up end;
    at least two shoulder inserts, the at least two shoulder inserts including first and second shoulder inserts extending circumferentially about the tire, the first and second shoulder inserts provided between the inner liner and at least one of the sidewalls of the tire, wherein at least one lower end of the first and second shoulder inserts terminates in the upper section of the tire and upper ends of the first and second shoulder inserts terminate in the upper section of the tire radially below the at least one belt;
    a chafer extending axially outward from the inner liner towards one of the sidewalls and having a curved portion curving radially upward along an axially outer portion of the bead core; and
    a sidewall gum strip extending radially upward from the curved portion of the chafer, wherein the sidewall gum-strip is located axially between the at least one carcass ply turn-up end and a sidewall.

2. The tire of claim 1, wherein the tire is configured to operate under a pressure of at least 35 pounds per square inch when mounted on a tire rim.

3. The tire of claim 1, wherein the at least three carcass plies include a first, second, third, fourth, and fifth carcass ply having first, second, third, fourth, and fifth turn-up ends.

4. The tire of claim 3, wherein at least two turn-up ends do not contact at least one of the radially downward extending carcass plies, the flipper, or the bead filler in one of the sidewalls.

5. The tire of claim 1, wherein the at least three carcass plies include a first, second, third, fourth, fifth, and sixth carcass ply having first, second, third, fourth, fifth, and sixth turn-up ends.

6. The tire of claim 5, wherein at least two turn-up ends do not contact at least one of the radially downward extending carcass plies, the flipper, or the bead filler in one of the sidewalls.

7. The tire of claim 1, wherein the at least three carcass plies include a first, second, third, fourth, fifth, sixth, and seventh carcass ply having first, second, third, fourth, fifth, sixth, and seventh turn-up ends.

8. The tire of claim 7, wherein at least two turn-up ends do not contact at least one of the radially downward extending carcass plies, the flipper, or the bead filler in one of the sidewalls.

9. A tire comprising:
    a circumferential tread;
    at least one belt;
    a pair of sidewalls;
    an inner liner;
    a pair of bead portions; wherein each bead portion includes a bead core and a bead filler; and
    at least three carcass plies extending circumferentially about the tire from one bead portion to the other, wherein the at least three carcass plies extend radially downward, inward of the bead filler, extend around the bead core, and continue upward, outward of the bead filler and terminate in at least three turn-up ends,
        wherein the at least three carcass plies include:

a first carcass ply having a first turn-up end that contacts at least one of the radially downward extending carcass plies in one of the sidewalls;

a second carcass ply having a second turn-up end inward of and below the first turn-up end, wherein the second turn-up end does not contact at least one of the radially downward extending carcass plies in one of the sidewalls; and a third carcass ply having a third turn-up end inward of and above the second turn-up end, and inward of and below the first turn-up end, wherein the third turn-up end contacts at least one of the radially downward extending carcass plies in one of the sidewalls.

10. The tire of claim 9, further comprising a fourth carcass ply having a fourth turn-up end disposed between the first turn-up end and the third turn-up end.

11. The tire of claim 10, further comprising a fifth carcass ply having a fifth turn-up end disposed between the first turn-up end and the third turn-up end.

12. The tire of claim 11, further comprising a sixth carcass ply having a sixth turn-up end disposed between the first turn-up end and the third turn-up end.

13. The tire of claim 12, further comprising a seventh carcass ply having a seventh turn-up end disposed between the first turn-up end and the third turn-up end.

14. The tire of claim 9, further comprising a flipper having a first end axially inward of an upper end of the bead filler, extending from the first end radially downward along an axially inner perimeter of the bead filler and around a perimeter of the bead core, continuing radially upward along an axially outer perimeter of the bead filler, and terminating at a second end axially outward of the upper end of the bead filler.

15. The tire of claim 9, further comprising a chafer extending axially outward from the inner liner towards one of the sidewalls and having a curved portion curving radially upward along an axially outer portion of the bead core, and a sidewall gum strip extending radially upward from the curved portion of the chafer.

16. A tire comprising:
a circumferential tread;
at least one belt;
a pair of sidewalls;
an inner liner;
a pair of bead portions; wherein each bead portion includes a bead core and a bead filler; and
n carcass plies extending circumferentially about the tire from one bead portion to the other, wherein n is a number greater than two,
  wherein n carcass plies extend radially downward, axially inward of the bead filler, extend around the bead core, and continue radially upward, axially outward of the bead filler and terminate in n turn-up ends,
  wherein at least an innermost turn-up end of the n turn-up ends contacts at least one of the radially downward extending carcass plies in one of the sidewalls,
  wherein at least an outermost turn-up end of the n turn-up ends contacts at least one of the radially downward extending carcass plies in one of the sidewalls, and
  wherein at least one, but not more than n−2 of the n turn-up ends does not contact at least one of the radially downward extending carcass plies in one of the sidewalls.

17. The tire of claim 16, further comprising:
at least one, but not more than n−1 shoulder inserts, extending circumferentially about the tire, the shoulder inserts provided between the inner liner and at least one of the sidewalls of the tire, and wherein an outermost turn-up end is radially highest.

* * * * *